June 5, 1956  F. C. McNARY  2,749,505
APPARATUS FOR GAGING
Filed Nov. 22, 1952
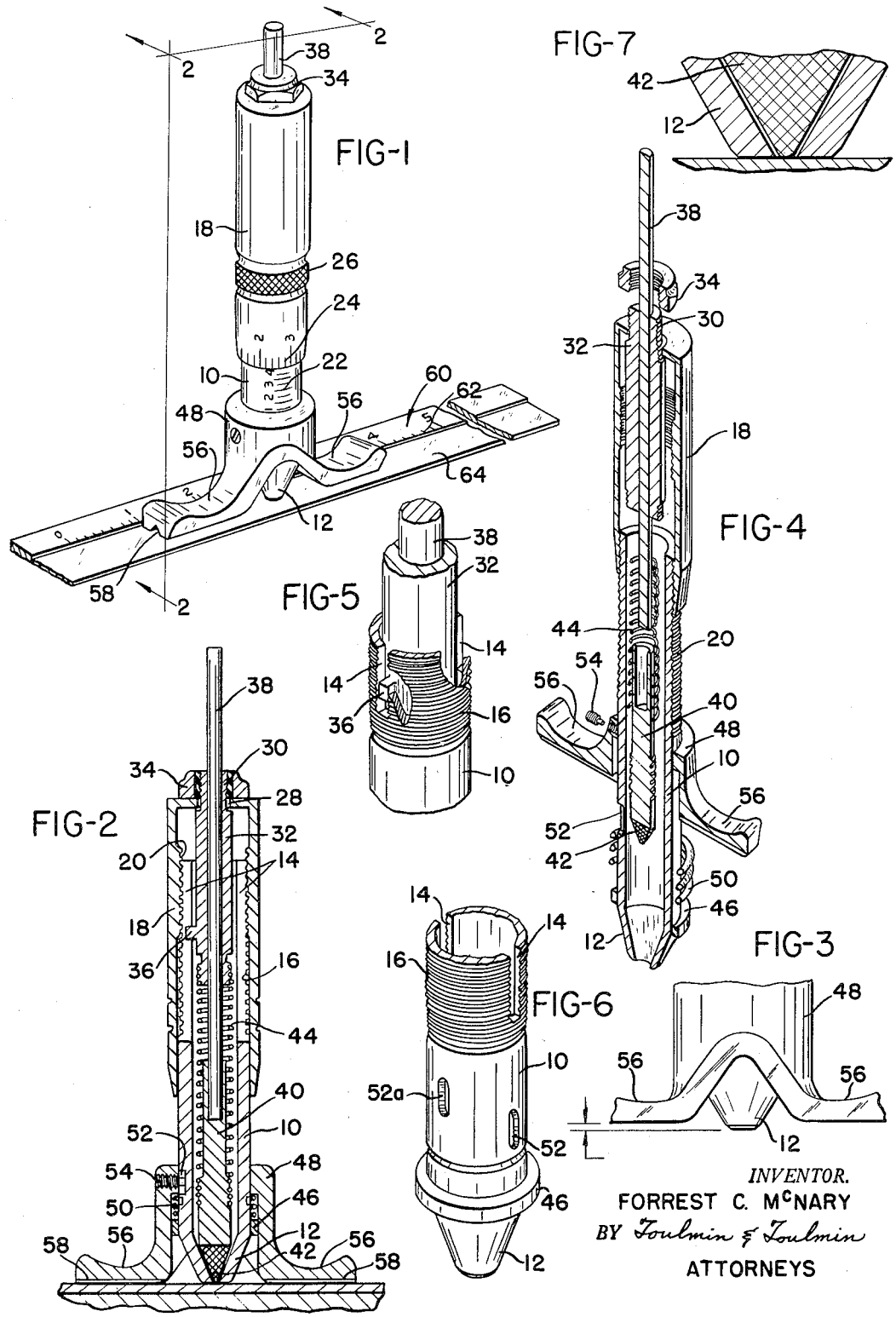
INVENTOR.
FORREST C. McNARY
BY Toulmin & Toulmin
ATTORNEYS

United States Patent Office 2,749,505
Patented June 5, 1956

2,749,505

APPARATUS FOR GAGING

Forrest Cline McNary, Springfield, Ohio

Application November 22, 1952, Serial No. 322,087

3 Claims. (Cl. 324—34)

This invention relates to a gage and a method of operation thereof, and particularly to a gage for measuring thicknesses of coatings such as paints, enamels, plating, galvanizing and other deposited films.

The gaging of coatings and films to any high degree of accuracy has always been extremely difficult, and gages heretofore which have been devised for this purpose have been unreliable.

One type of gaging instrument of this nature which has been somewhat successful is a comparator instrument which measures coating thickness by comparing the magnetic attractions of either the coating or the base material therebeneath with a coating of known thickness having similar magnetic properties. This instrument takes the form of a barrel having reciprocably mounted therein a magnetic element that is spring biased away from the work member to be gaged. By adjusting the bias of the spring until the magnetic element is either on the point of being released or is just released, the true nature of the coating can be learned by transferring the instrument to a master gage bar and positioning it thereon until the magnetic element of the gaging instrument operates in the same manner as it did on the work member being measured.

One outstanding difficulty with this type of gage, however, is that an extremely high degree of skill is required in its operation and, even with skilled and trained operators, fatigue and accidental mishandling of the instrument will result in unreliable readings.

Having the foregoing in mind, it is a primary object of the present invention to devise a gaging instrument of the nature described and a method of operation thereof, such that even a relatively unskilled operator can get accurate results over a comparatively long period of time.

A further object of this invention is to provide a gaging instrument and a method of operation in which the human element is eliminated to a substantial degree so that accurate results can be obtained with the exercise of the smallest amount of skill.

A still further object is the provision of a gaging instrument and a method of operation in which uniform and precisely accurate indications are had at all times during the operation of the instrument whereby extremely accurate results can be obtained.

It is also an object of this invention to provide a gaging instrument which is relatively inexpensive to construct and which is extremely rugged so as to be able to withstand considerable physical abuse while, at the same time, an extremely high degree of accuracy is maintained at all times.

The objects referred to above, as well as still other objects and advantages of this invention, will become more apparent upon reference to the following specification taken in connection with the accompanying drawings, in which:

Figure 1 is a perspective view showing a gaging instrument according to this invention and positioned on a calibrated master or bar;

Figure 2 is a vertical section through the instrument indicated by a cutting plane on lines 2—2—2 of Figure 1;

Figure 3 is an enlarged detailed view showing the amount of movement provided between the barrel of the instrument and the spring biased hold-down foot thereof;

Figure 4 is an exploded perspective view of the instrument showing the several parts thereof;

Figure 5 is a perspective view of a portion of the instrument showing how the inner guide thereof is retained in the barrel so that it will not rotate;

Figure 6 is a perspective view of the barrel showing how slots can be provided for different adjustments of the spring pressed hold-down foot of the instrument; and Figure 7 is an enlarged sectional view showing a detail of construction of the barrel.

Referring to the drawings somewhat more in detail, and particularly to Figures 1, 2 and 4, the instrument, according to this invention, comprises a barrel 10 having an inwardly tapering conical lower end part 12. The upper end of the barrel is slotted as at 14 and has the external threads 16. Screw threadedly engaging threads 16 of barrel 10 is thimble 18 which has the internal threads 20 that engage the said threads 16 of the barrel.

As will be seen in Figure 1, barrel 10 is calibrated at 22 and the lower end of thimble 18 is calibrated at 24 so that a micrometer arrangement is had whereby precise adjustment of the thimble 18 on the barrel 10 can readily be had. Thimble 18 preferably includes a knurled portion 26 to facilitate rotation thereof.

The upper end of thimble 18 has an aperture 28 therein, and extending through the aperture is the reduced diameter portion 30 of guide 32. Portion 30 of the guide is threaded for receiving a lock nut 34, which is preferably of the type having a plastic insert so that it will remain in adjusted position on portion 30 of guide 32. Guide 32 has a shoulder at the bottom of reduced diameter portion 30, and by tightening lock 34 on the said portion 30 guide 32 can be locked to thimble 18. On the other hand, if nut 34 is loosened somewhat then thimble 18 can rotate freely relative to guide 32.

Guide 32 advantageously includes projections or lugs 36 extending into slots 14 of barrel 10 and this serves to retain guide 32 against rotation in barrel 10 while permitting free reciprocation of the said guide in the barrel.

Guide 32 is bored from end to end for receiving an indicator and operating rod 38, the lower end of which is connected with a member or magnet carrier 40, the extreme lower end of which is, in turn, connected with the magnet 42. Magnet 42 is conically shaped so as to fit within the conical end part of barrel 10, with the extreme lower end of the magnet 42 either flush with the end of barrel 10 or projecting slightly beyond the end of the said barrel.

The member 40 and the lower end of guide 32 are formed with a grooved portion for connection with the opposite ends of a tension spring 44 which biases indicator rod 38 and member 40 and magnet 42 upwardly within the barrel 10.

The extreme lower end of barrel 10 at the top of the conical end part 12 is provided with a flange ring 46, and reciprocably mounted about barrel 10 above flange ring 46 is a spring pressed foot 48 continuously urged upwardly by compression spring 50 bearing between the foot and ring 46. A slot 52 in the side of the barrel receives the end of a screw 54 in the foot and this serves to limit the amount of movement which the foot can take on the barrel.

Foot 48, as will best be seen in Figure 1, extends out from opposite sides of barrel 10 to form a pair of finger pieces 56. The under surface of the finger pieces is machined off flat and may advantageously include a V-shaped groove 58 which reduces the contact area of the underneath sides of the finger pieces while, at the same time, providing for widely spaced areas of engagement of the foot with a member against which it is pressed thereby to stabilize the operation of the gaging instrument.

The entire instrument, with the possible exception of the springs and screw 54 and magnet 42, is preferably formed of a non-magnetic material such as aluminum so that the only magnetic attraction that will exist for magnet 42 will be the work member or coating being gaged. The magnet 42 itself is preferably of Alnico or some other extremely strong magnetic alloy.

In operation, the instrument is placed against a work member and held in position thereon by pressing the foot 48 against the work member between finger pieces 56. Because of the relaitvely widely spaced points of engagement of the foot with the work member, the barrel 10 is held at an accurate angle thereto, preferably normal to the said surface, and because of the provision of spring 50 the end of the barrel is pressed against the work member with a predetermined and exact pressure. Because of the exact angle at which barrel 10 is presented to the work and the precise and predetermined pressure with which the barrel engages the work, exactly the same conditions will obtain in all cases and the readings from the instrument will thus be reliable on all occasions. Further, delicate finishes are not harmed by the use of the instrument, and likewise the instrument itself is not harmed by being brought into forcible engagement with the work member. Even relatively soft finishes, such as strippable rust-proofing and moisture-excluding coatings will not be damaged by the use of the instrument when provided with a hold-down foot according to this invention. Further, the provision of the hold-down foot also enables the instrument to be used in any position and highly accurate results can be had.

Turning now to the actual operation of the device, there is provided with the instrument a calibrated master, such as is indicated at 60 in Figure 1. This master comprises a bar having calibrations 62 along one side and a finished surface 64 along the other side which consists of a tapering film, preferably of plated metal. For example, the master 60 could be made of a certain type of steel and the finished surface 64 could consist of a tapering film of chromium plated thereon, the tapering on the film being arrived at, of course, by a precision grinding operation.

By so making the master 60 that the calibrations thereon represent the thicknesses of the plated film on surface 64, the said master can be employed for setting the gaging instrument before gaging of a work member thereby, or can be employed for checking the instrument after the workpiece has been gaged.

One typical work cycle would proceed as follows:

The surface of the work to be measured would be carefully cleaned at the check point, and the end of barrel 10 and the tip of magnet 42 would likewise be carefully cleaned thereby to remove all foreign material, such as dust, therefrom. The instrument would then be placed on the workpiece at the check point and held in position by pressing on the finger pieces 56 or foot 48. The magnet 42 is then brought against the surface of the work member by pressing on the upper end of indicator rod 38. If the magnet does not hold to the work member, thimble 18 is rotated until the magnet does hold. The thimble is then rotated in the opposite direction until the magnet is just released from the surface. Preferably, the release point of the magnet from the surface is checked by again turning the thimble down, pressing the magnet to the work, and then slowly rotating the thimble in the opposite direction until the magnet again releases.

At this time the micrometer graduations on the thimble and barrel may be read for reference.

Without adjusting the thimble the instrument is now placed on surface 64 of master 60, and the indicator rod 38 again pressed to bring the magnet against the surface of the master.

By adjusting the instrument along surface 64 until the point is reached where the magnet just fails to hold against surface 64, the thickness of the coating on the work member can be determined by reading on the calibrated scale on the master 60. It will be understood, of course, that the master and the work member being checked have substantially the same magnet characteristics, and that the coatings being measured likewise are possessed of equivalent magnetic properties.

The gage, according to this invention, can also be used as a limit gage, for example, as for inspection, by setting the instrument at a predetermined point along the master, adjusting the thimble to the pull-away point, and then locking the thimble and barrel together by tightening nut 34 on projection 30 of guide 32. The setting of the gage can then be carefully checked. Thereafter, the instrument can be used as a limit gage for go and no-go inspection of the work-pieces.

It will be apparent that inasmuch as the instrument is adapted for measuring the thickness of substantially any coating on a base material where either the base material or the coating, or both, are possessed of magnetic properties, the actual structure of magnet 42 and spring 44 will be varied to provide for the degree of magnetic attraction required to operate the instrument and also different masters 60 are preferably provided in order to adapt the instrument to all gaging circumstances.

For example, plating films of non-magnetic materials, such as chromium, copper, tin, zinc, brass, silver and gold, as well as paints, lacquers, enamels and coatings of paraffin, hard greases and strippable coatings may be placed on steel, and for measuring these coatings it is preferable to have a calibrated master which is made up of steel with a non-magnetic coating.

Other coatings, such as nickel, are in themselves magnetic, and for measuring these coatings it is preferable to have a master which consists of a magnetic coating on a magnetic base.

In still other cases, there may be a magnetic coating, such as nickel, on a non-magnetic base, such as brass. For this class of work, a corresponding master can be constructed or a correction can be made in the reading taken by the instrument in the following manner:

The difference in pull-away readings is determined for the unplated surface of the master and the uncoated base material.

Thereafter, when a reading is taken in the manner described above, the difference in pull-away readings referred to is subtracted from the indicated thickness where the base material reading is less and added to the indicated thickness where the base material reading is greater.

In this manner, the instrument can be applied for obtaining accurate determinations of coating thicknesses when the material of the calibrated master 60 is different from the base material on which the coating being measured is applied.

The arrangement illustrated in the drawings, and particularly as described above, is especially adapted for use in connection with flat work members, but it will be apparent that the gaging instrument, according to the present invention, could be utilized for surfaces of other configurations by suitably modifying the hold-down foot so that when the instrument is placed on the work member to be checked it would be pressed thereagainst under a predetermined pressure and at a predetermined angle thereto.

One relatively simple manner of adapting the instrument to a surface other than a flat surface is contemplated in the provision of an additional slot in the barrel 10 for receiving the end of screw 54, as indicated at 52a in Figure 6. This auxiliary slot would, for example, adapt the instrument for use on concave surfaces as well as flat surfaces. Still other surface configurations could be checked by modifying the construction of the hold-down foot.

One of the extremely important usages of the gaging instrument of the present invention is the measuring of extremely thin films, such as plating films on work members. It will be apparent that with extremely thin films it becomes important to eliminate as far as possible all chances of improperly supporting the instrument against the work, or against the calibrated master, because any slight deviation in the measuring process at any point in checking thin films would result in a substantial and generally intolerable error. Because of the arrangement of my gaging instrument with the spring pressed hold-down foot which insures that the instrument will be presented to the work at the exact proper angle and always with uniform pressure, I have found that I am able to obtain a high degree of accuracy of readings for very thin films, and to obtain this degree of accuracy repetitively even by relatively unskilled operators.

In connection with the employment of the gaging instrument with a concave surface, it is preferable that the lower end of the barrel include a slight bevel as will best be seen in Figure 7 so that good contact with the surface to be checked can be had and as close to the point of the magnet as is possible.

Also, inasmuch as some clearance must be provided about rod 38, member 40, and magnet 42 within the barrel, there is a possibility of the magnet tilting somewhat in use, and for this reason it is to be preferred to form the lower work engaging end of the magnet to a spherical shape. In this manner the small amount of tilting of the magnet which takes place will not detract from the accuracy of the readings thereof.

It will be understood, of course, that the spring 50 will be selected so that the proper pressure will be exerted on the barrel of the instrument urging it against the work. Normally, the hold-down member 48 will have only a small movement on the barrel, as indicated in Figure 3, and for coatings that are relatively easily deformed, such as paraffin coatings or strippable protective coatings, a relatively weak spring will be employed between the hold-down member and the barrel so that the barrel will not damage or deform the coating being made.

It will also be evident that the principle of a resilient hold-down is useful for many other types of instruments other than the specific one illustrated in the drawings. For example, portable hand operated hardness testers, particularly of the rebound type, are well adapted for being equipped with a hold-down member according to my invention.

In still other cases it may be desired or necessary to present an object to another in precise relation for some reason other than a measuring or gaging purpose, and my invention can be availed of for accomplishing this result as well.

It will, therefore, be understood that this invention encompasses the principle of the resilient hold-down and devices for accomplishing this result in situations other than are specifically set forth or referred to in this application.

It will be understood that this invention is susceptible to modification in order to adapt it to different usages and conditions, and, accordingly, it is desired to comprehend such modifications within this invention as may fall within the scope of the appended claims.

I claim:

1. In an instrument for measuring coating thicknesses: a hollow cylindrical barrel having a straight end portion and a tapering inwardly end portion, a thimble threaded to the straight end portion of the barrel, a guide rotatably carried by the thimble and extending into the barrel, a rod extending through the guide and reciprocable therein and carrying a magnet on the end within the barrel, said magnet being shaped to fit within said tapered end portion of the barrel so the end of the magnet is at least flush with said end of the barrel, a tension spring connected between the rod and the guide to urge the rod away from said tapered end of the barrel, and a hold-down foot loosely mounted on the tapered end of the barrel for limited movement relative thereto, said hold-down foot comprising laterally extending finger pieces and the underneath surfaces of said finger pieces being adapted for being brought into co-planar relation with the said one end of said barrel, said hold-down foot being spring urged on said barrel so that said tapered end of the barrel normally projects beyond the plane of the said underneath surfaces of said finger pieces.

2. In combination with an instrument for gaging thicknesses of non-magnetic coatings on magnetic surfaces and having a hollow cylindrical barrel having a straight end portion and a tapering inwardly end portion, a thimble threaded to the straight end portion of the barrel, a guide rotatably carried by the thimble and extending into the barrel, a rod extending through the guide and reciprocable therein and carrying a magnet on the end within the barrel, said magnet being shaped to fit within said tapered end portion of the barrel so the end of the magnet is at least flush with said end of the barrel, a tension spring connected between the rod and the guide to urge the rod away from said tapered end of the barrel, and a hold-down foot having laterally extending finger pieces resiliently mounted on the tapered end of said barrel for repeatedly pressing the end of said barrel against the coating at a predetermined and exact angle and at a precise pressure whereby the same conditions will obtain in all readings.

3. In combination with an instrument for gaging thicknesses of non-magnetic coatings on magnetic surfaces and having a hollow cylindrical barrel having a straight end portion and a tapering inwardly end portion, a thimble threaded to the straight end portion of the barrel, a guide rotatably carried by the thimble and extending into the barrel, a rod extending through the guide and reciprocable therein and carrying a magnet on the end within the barrel, said magnet being shaped to fit within said tapered end portion of the barrel so the end of the magnet is at least flush with said end of the barrel, a tension spring connected between the rod and the guide to urge the rod away from said tapered end of the barrel, a hold-down foot loosely mounted for longitudinal movement on the barrel at the said open end thereof and comprising a sleeve portion surrounding the barrel and lateral projections from the end of said sleeve portions adjacent the end of the barrel forming finger pieces for pressing the foot against the work member to be checked, a spring urging the foot member upwardly on the barrel, and a lost motion connection between the foot member and the barrel for limiting the relative movement therebetween, the end of said barrel normally projecting beyond the end of the foot member whereby the foot member is operable when pressed against the surface of a work member to support the barrel at a fixed angle thereto and urged against the work member under a predetermined thrust.

References Cited in the file of this patent

UNITED STATES PATENTS

| | | |
|---|---|---|
| 504,278 | Preston | Aug. 29, 1893 |
| 1,922,895 | Lemaire | Aug. 15, 1933 |
| 2,142,619 | Sciaky | Jan. 3, 1939 |
| 2,401,085 | La Valley | May 28, 1946 |
| 2,441,317 | Gribble | May 11, 1948 |
| 2,536,632 | Ernst | Jan. 2, 1951 |
| 2,625,585 | Krouse | Jan. 13, 1953 |